(No Model.)

W. T. GILL.
CURRY COMB.

No. 316,138. Patented Apr. 21, 1885.

Attest:
H. S. Knight
Edward Stev.

Inventor:
W. T. Gill
By Knight Bros
Attys

N. PETERS, Photo-Lithographer, Washington, D. C.

UNITED STATES PATENT OFFICE.

WILLIAM T. GILL, OF OTTERVILLE, MISSOURI.

CURRY-COMB.

SPECIFICATION forming part of Letters Patent No. 316,138, dated April 21, 1885.

Application filed August 22, 1884. (No model.)

*To all whom it may concern:*

Be it known that I, WILLIAM T. GILL, of Otterville, in the county of Cooper and State of Missouri, have invented a certain new and useful Improvement in Curry-Combs, of which the following is a full, clear, and exact description, reference being had to the accompanying drawings, forming part of this specification, and in which—

Figure 1:
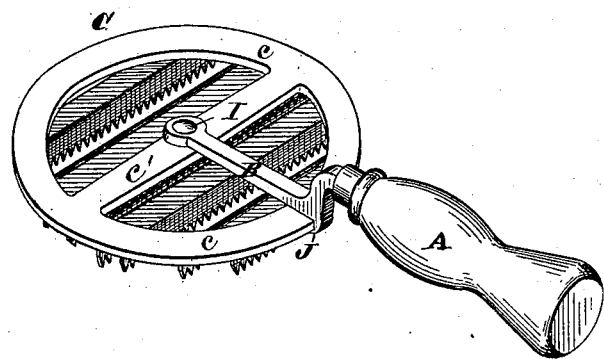
Figure 2:
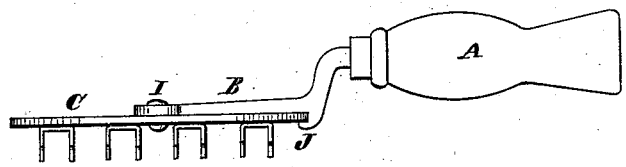
Figure 3:
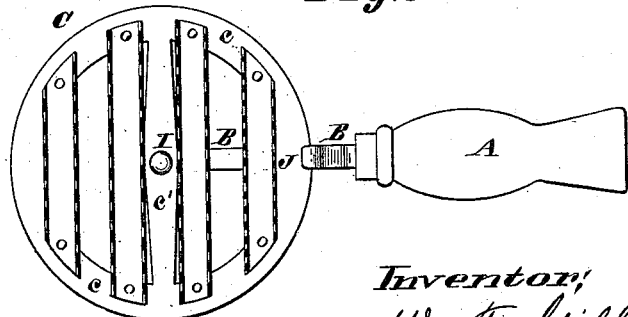

Figure 1 is a top perspective view. Fig. 2 is a side elevation. Fig. 3 is a bottom view.

My invention relates to a revolving curry-comb; and it consists in features of novelty, hereinafter fully described, and pointed out in the claims.

Referring to the drawings, A represents the handle having a shank, B, in line therewith at a lower elevation, and C the circular body of the comb formed with ring $c$ and cross-bar $c'$, secured by its center to the end of the shank by a pin or pintle, I, that allows the body to turn freely as the comb is used. The handle end of the shank has a lip, J, that extends beneath the ring of the body. When it is desired to prevent the body from turning in the use of the comb, it is only necessary to press with the thumb on the body at either side of the shank, which will cause the body to be cramped between the lip and the body of the shank, which will effectually prevent its turning.

The body preferably consists of a ring, to which the teeth-bars of ⊓-shape in transverse section and parallel with each other are riveted, and a cross-bar to which the shank is pivoted.

I claim as my invention—

1. In a curry-comb, the combination, with a handle, A, of the shank B in line therewith, a circular plate, C, consisting of a ring, $c$, and cross-bars, $c'$, parallel series of toothed bars J, and a pivot, I, by which the center of the plate is journaled to the end of the shank.

2. In a curry-comb, the combination, with a handle, A, of the shank B in line therewith, having a downward projection provided with a lip, J, to form a support for the plate, a circular plate, C, consisting of a ring, $c$, and cross bar $c'$, parallel series of toothed bars J, and a pivot, I, by which the center of the plate is journaled to the end of the shank.

WILLIAM T. GILL.

In presence of—
AUGUSTUS L. ZOLLINGER,
JOHN H. HUPP.